United States Patent
Jeong et al.

(10) Patent No.: US 11,024,866 B2
(45) Date of Patent: Jun. 1, 2021

(54) ELASTOMERIC CELL FRAME FOR FUEL CELL, METHOD OF MANUFACTURING SAME, AND UNIT CELL HAVING SAME

(71) Applicants: Hyundai Motor Company, Seoul (KR); Kia Motors Corporation, Seoul (KR)

(72) Inventors: Byeong-Heon Jeong, Yongin-Si (KR); Jin Hyeok Yoo, Cheonan-Si (KR); Seong Il Heo, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 104 days.

(21) Appl. No.: 16/670,951

(22) Filed: Oct. 31, 2019

(65) Prior Publication Data
US 2020/0194816 A1 Jun. 18, 2020

(30) Foreign Application Priority Data
Dec. 12, 2018 (KR) .................. 10-2018-0160112

(51) Int. Cl.
| | |
|---|---|
| *H01M 8/249* | (2016.01) |
| *H01M 8/1007* | (2016.01) |
| *H01M 8/00* | (2016.01) |
| *H01M 8/2404* | (2016.01) |
| *H01M 8/1097* | (2016.01) |
| *H01M 8/242* | (2016.01) |
| *H01M 8/0247* | (2016.01) |
| *H01M 8/1004* | (2016.01) |

(52) U.S. Cl.
CPC ........... *H01M 8/249* (2013.01); *H01M 8/006* (2013.01); *H01M 8/0247* (2013.01); *H01M 8/1007* (2016.02); *H01M 8/1097* (2013.01); *H01M 8/242* (2013.01); *H01M 8/2404* (2016.02); *H01M 8/1004* (2013.01)

(58) Field of Classification Search
CPC .... H01M 8/249; H01M 8/1007; H01M 8/006; H01M 8/2404; H01M 8/1097; H01M 8/242; H01M 8/0247; H01M 8/1004
See application file for complete search history.

(56) References Cited

U.S. PATENT DOCUMENTS

| | | | | |
|---|---|---|---|---|
| 2008/0118802 A1* | 5/2008 | Szrama | ............... | H01M 8/0273 429/483 |
| 2015/0064600 A1* | 3/2015 | Katsuno | .................. | B32B 37/10 429/482 |

FOREIGN PATENT DOCUMENTS

| | | |
|---|---|---|
| JP | 2017-212126 A | 11/2017 |
| KR | 10-0876262 B1 | 12/2008 |
| KR | 10-1473500 B1 | 12/2014 |

(Continued)

*Primary Examiner* — Stewart A Fraser
(74) *Attorney, Agent, or Firm* — Morgan, Lewis & Bockius LLP

(57) ABSTRACT

An elastomeric cell frame forming a unit cell of a fuel cell stack may include an insert in which a membrane electrode assembly and a pair of gas diffusion layers are bonded to each other; and an elastomeric frame disposed to surround a periphery of side surfaces of the insert, in which the side surfaces of the insert are positioned between the upper and lower surfaces of the insert, one of upper and lower surfaces of the insert and side surfaces of the insert and bonded with the periphery of the surface of the insert and the side surfaces of the insert into an integrated structure by thermal bonding.

20 Claims, 2 Drawing Sheets

(56) References Cited

FOREIGN PATENT DOCUMENTS

KR 10-1783060 B1 9/2017
KR 10-2018-0011716 A 2/2018

* cited by examiner

ELASTOMERIC CELL FRAME FOR FUEL CELL, METHOD OF MANUFACTURING SAME, AND UNIT CELL HAVING SAME

CROSS REFERENCE TO RELATED APPLICATION

The present application claims priority to Korean Patent Application No. 10-2018-0160112, filed Dec. 12, 2018, the entire contents of which is incorporated herein for all purposes by this reference.

BACKGROUND OF THE INVENTION

Field of the Invention

The present invention generally relates to an elastomeric cell frame for a fuel cell, a method of manufacturing the same, and a unit cell having the same. More particularly, the present invention relates to an elastomeric cell frame for a fuel cell, a method of manufacturing the same, and a unit cell having the same, the elastomeric cell frame being configured such that a sheet-shaped elastomeric frame made of a thermoplastic elastomer (TPE) is bonded to a membrane electrode assembly and gas diffusion layers into an integrated structure without using an adhesive member.

Description of Related Art

A fuel cell refers to a generator that converts chemical energy of a fuel into electrical energy through an electrochemical reaction. Fuel cells are used not only to supply driving power for industrial purposes, household purposes, and vehicles, but also to power small electronic products such as portable devices. Recently, the application for fuel cells has been gradually expanded to a highly efficient and clean energy source.

A general unit cell of a fuel cell stack is configured such that a membrane electrode assembly (MEA) is disposed at the innermost position. The MEA is configured with a polymer electrolyte membrane (PEM) allowing protons to pass therethrough, and catalyst layers, i.e., a cathode and an anode, provided on opposite sides of the PEM.

Furthermore, a pair of separators is disposed on one surface and the opposite surface of the MEA, respectively, i.e., the outside portions where the cathode and the anode are located, and serves to supply reaction gas and discharge product water produced by reaction. Here, a gas diffusion layer (GDL) may be interposed between the MEA and one of the separators to facilitate diffusion of the reaction gas and the product water.

Generally, a membrane electrode gasket assembly (MEGA) in which an MEA and a gasket are integrated was fabricated and used for sealing of unit cells and convenience in stacking processes.

In recent years, an integrated frame in which a gasket and an insert in which a GDL and an MEA are bonded are provided in an integrated structure has been provided.

However, the conventional integrated frame is configured such that a plastic frame and the insert are bonded using an adhesive. Furthermore, in the case of manufacturing a unit cell using the conventional integrated frame, an adhesive member and a sealing member are required for bonding separators and the integrated frame. This process increases material cost and production costs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an elastomeric cell frame for a fuel cell, a method of manufacturing the same, and a unit cell having the same, the elastomeric cell frame being configured such that a sheet-shaped elastomeric frame made of a thermoplastic elastomer (TPE) is hot-press bonded to a membrane electrode assembly and gas diffusion layers into an integrated structure without using an adhesive member.

In various aspects of the present invention, there is provided an elastomeric cell frame for a fuel cell which forms a unit cell of a fuel cell stack, the elastomeric cell frame including: an insert in which a membrane electrode assembly (MEA) and a pair of gas diffusion layers (GDLs) disposed on upper and lower surfaces of the MEA are bonded to each other; and a sheet-shaped elastomeric frame disposed in an external region of the insert wherein the elastomeric frame is provided to surround a periphery of one of opposite surfaces of the insert, and side surfaces of the insert, and bonded with the periphery of the one of the opposite surfaces of the insert and the side surfaces of the insert into an integrated structure by thermal bonding.

The thermal bonding may be any one of hot-press bonding, ultrasonic bonding, high frequency bonding, vibration bonding, infrared bonding, radiant-heat bonding, calender bonding and laser bonding.

The elastomeric frame may be configured with an insert receiving hole in which the insert is disposed, and an internal circumferential surface of the insert receiving hole may be configured with a step surrounding the one of the opposite surfaces of the insert and the side surface of the insert.

Thermal-bonded portions provided between the insert and the elastomeric frame, may include: a first thermal-bonded portion in which the step of the elastomeric frame and the one of the opposite surfaces of the insert face each other and are thermally bonded together; and a second thermal-bonded portion formed in a shape of a recess, in which the side surface of the insert is thermally bonded to the second thermal-bonded portion.

Multiple inlet manifold through-holes through which reaction gas and coolant are introduced may be provided on a first side of the elastomeric frame, and multiple outlet manifold through-holes through which the reaction gas and the coolant are discharged may be provided on a second side of the elastomeric frame, which is an opposite side of the inlet manifold through-holes.

At least one of the opposite surfaces of the elastomeric frame may be provided with at least one protrusion seal surrounding the insert along the external region of the insert.

The elastomeric frame may be formed of a thermoplastic elastomer (TPE).

In various aspects of the present invention, there is provided a method of manufacturing an elastomeric cell frame for a fuel cell which forms a unit cell of a fuel cell stack, the method including: preparing an insert by bonding GDLs to opposite surfaces of an MEA; preparing a sheet-shaped elastomeric frame; disposing the insert so that a periphery of one of opposite surfaces of the insert, is overlapped with the elastomeric frame; and integrating the elastomeric frame and the insert with each other by thermal bonding in which an overlapped portion of the elastomeric frame and the insert is heated and pressed.

The thermal bonding may be any one of hot-press bonding, ultrasonic bonding, high frequency bonding, vibration bonding, infrared bonding, radiant-heat bonding, calender bonding and laser bonding.

In the preparing of the elastomeric frame, the elastomeric frame may be prepared by molding a TPE into a sheet form.

In the preparing of the elastomeric frame, the elastomeric frame may be configured with an insert receiving hole in which the insert is disposed. Furthermore, an internal circumferential surface of the insert receiving hole may be configured with a step surrounding the one of the opposite surfaces of the insert and the side surface of the insert. In the disposing of the insert, the insert may be disposed such that the periphery of the one of the upper and lower surfaces of the insert is accommodated on the step.

In the integrating of the elastomeric frame and the insert, heat applied to the elastomeric frame may be higher than melting temperature of the elastomeric frame.

In the integrating of the elastomeric frame and the insert, the elastomeric frame may be thermally bonded to the insert without using an adhesive member.

In various aspects of the present invention, there is provided a unit cell for a fuel cell, the unit cell including: an insert in which an MEA and a pair of GDLs disposed on upper and lower surfaces of the MEA are bonded to each other; an elastomeric cell frame including a sheet-shaped elastomeric frame disposed in an external region of the insert wherein the elastomeric frame is provided to surround a periphery of one of opposite surfaces of the insert, and side surfaces of the insert, and bonded with the periphery of the one of the opposite surfaces of the insert and the side surfaces of the insert into an integrated structure by thermal bonding; and a pair of separators disposed on opposite surfaces of the elastomeric cell frame to guide flow of reaction gas and coolant.

The thermal bonding may be any one of hot-press bonding, ultrasonic bonding, high frequency bonding, vibration bonding, infrared bonding, radiant-heat bonding, calender bonding and laser bonding.

The present invention has the following effects.

First, no adhesive member is required for interfacial bonding between an elastomeric frame and an insert, reducing material cost and eliminating an adhesive application process, leading to reduction of manufacturing cost.

Second, airtightness of a reaction region may be ensured without using a sealing member, and as no sealing member is required, material cost is reduced and a sealing member molding process is eliminated, leading to reduction of manufacturing cost.

Third, water produced in a reaction region may be prevented from diffusing out of a cell through an electrolyte membrane, whereby electrical short-circuit between cells may be prevented, and corrosion of a fuel cell stack caused by moisture leakage may be prevented.

Fourth, an electrolyte membrane used to be used in a region other than a reaction region is not used whereby material cost may be reduced.

Fifth, decrease in cell pitch is advantageous compared with the conventional plastic frame, and a stack may be miniaturized due to reduced volume thereof.

Sixth, weight reduction may be expected compared with a conventional plastic frame using an adhesive member and a sealing member.

Seventh, an integration process in stacking of fuel cells is reduced whereby a production line may be simplified and productivity of manufacturing a stack (efficiency in cell stacking) may be improved.

Eighth, unit cell components are placed in a mold and thermally bonded together such that accuracy in bonding with an insert may be improved, whereby it is possible to expect reduction in defect rate and achieving of mass production.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
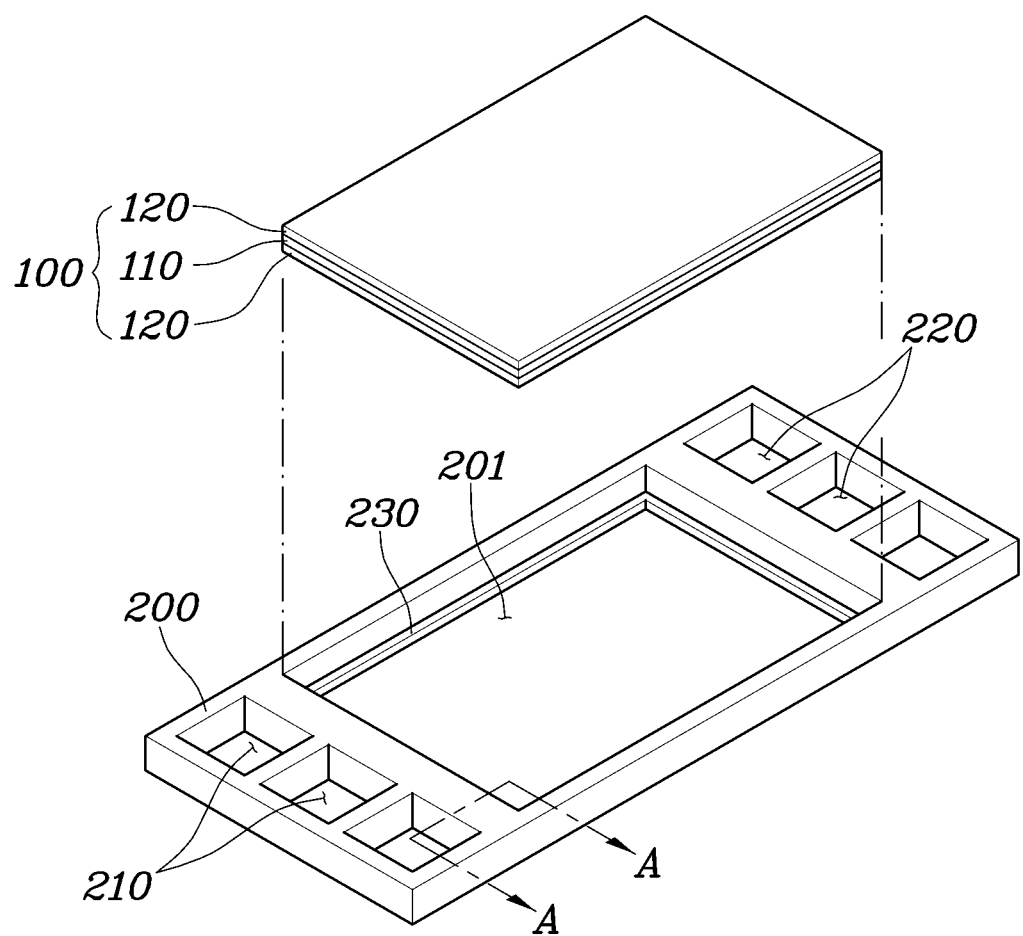
FIG. 1 is an exploded perspective view exemplarily illustrating an elastomeric cell frame for a fuel cell according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. While the present invention will be described in conjunction with exemplary embodiments thereof, it is to be understood that the present description is not intended to limit the present invention to those exemplary embodiments. On the other hand, the present invention is directed to cover not only the exemplary embodiments of the present invention, but also various alternatives, modifications, equivalents, and other embodiments which may be included within the spirit and scope of the present invention as defined by the appended claims. Throughout the drawings, the same reference numerals will refer to the same or like parts.

Figure 2:
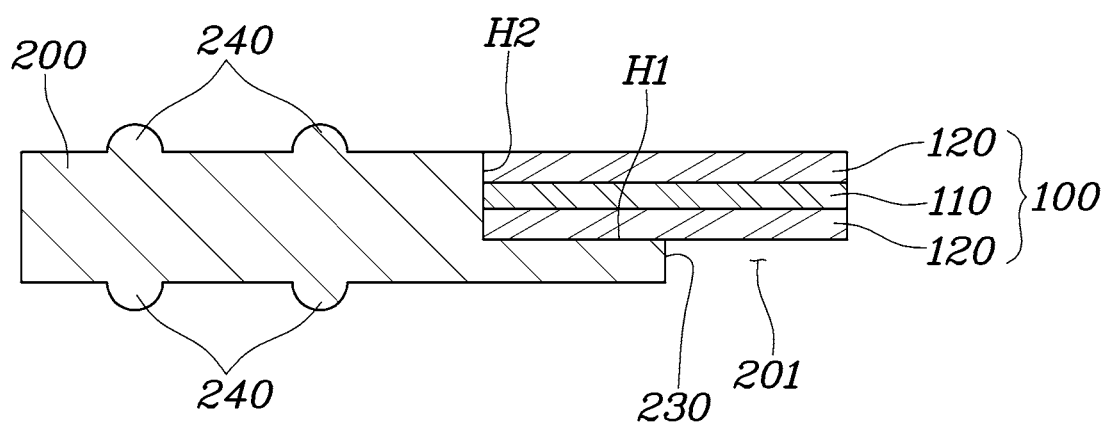
FIG. 2 is a cross-sectional view exemplarily illustrating a substantial portion of the elastomeric cell frame for a fuel cell according to the exemplary embodiment of the present invention.

FIG. 1 is an exploded perspective view exemplarily illustrating an elastomeric cell frame for a fuel cell according to an exemplary embodiment of the present invention; and FIG. 2 is a cross-sectional view exemplarily illustrating a substantial portion of the elastomeric cell frame for a fuel cell according to the exemplary embodiment of the present invention. Here, FIG. 2 is a cross-sectional view taken along line A-A of FIG. 1.

As illustrated in the figures, an elastomeric cell frame for a fuel cell according to an exemplary embodiment of the present invention is an element forming a unit cell of a fuel cell stack with a pair of separators, and the elastomeric cell frame includes: an insert 100 in which a membrane electrode assembly (MEA) 110 and a pair of gas diffusion layers (GDLs) 120 are bonded to each other; and an elastomeric frame 200 provided to be integrated with the insert 100 in an external region of the insert 100 by thermal bonding.

Here, the thermal bonding may be any one of hot-press bonding, ultrasonic bonding, high frequency bonding, vibration bonding, infrared bonding, radiant-heat bonding, calender bonding and laser bonding. The thermal bonding is preferably a hot-press bonding in which heat and pressure are easily provided. The insert 100 is an integrated element in which the MEA 110 and the pair of GDLs 120 are stacked. The GDLs 120 are disposed on one surface and the opposite surface of the MEA 110, respectively.

The MEA 110 is implemented as a general MEA which is configured with a proton-exchange membrane (PEM) allowing protons to pass therethrough, and catalyst layers, i.e., a cathode and an anode, provided on opposite surfaces of the PEM.

The GDLs 120 are configured to diffuse reaction gas to the MEA 110, which flows through the separators and therethrough. The GDLs 120 may be configured as a single substrate or configured as a substrate with a microporous layer (MPL) provided as a surface of the substrate. Here, materials of the substrate and the MPL are embodied as materials applied to a general GDL.

The elastomeric frame 200 is provided to be integrated with the insert 100 in the external region of the insert 100 for sealing of the insert 100 and for convenience in stacking process. The elastomeric frame 200 is formed of a thermoplastic elastomer (TPE) to maintain a predetermined shape and be thermally bonded without using an adhesive member.

Furthermore, the elastomeric frame 200 is disposed in the external region of the insert 100 such that the elastomeric frame 200 surrounds a periphery of one of opposite surfaces of the insert 100 and side surfaces of the insert 100. Accordingly, the elastomeric frame 200 is thermally bonded with the periphery of the one of the opposite surfaces of the insert 100 and the side surfaces of the insert 100 such that the elastomeric frame 200 is integrated with the insert 100. The "external region" of the insert 100 refers to a region including an edge area of the insert 100 and the surrounding region. A periphery of one of the opposite surfaces of the insert 100 refers to the edge area of the insert 100. As the elastomeric frame 200 is disposed in the external region of the insert 100 to surround a periphery of one of the opposite surfaces of the insert 100 and the side surfaces of the insert 100, hereinafter, the one surface of the opposite surfaces of the insert 100 is referred to as "lower surface" for convenience of explanation. It is obvious that any one of the opposite surfaces of the insert 100 is not limited to the "lower surface", but may be the opposite one, i.e., an upper surface.

For example, as illustrated in FIG. 1 and FIG. 2, the elastomeric frame 200 is disposed to surround the external region of the insert 100 while facing a periphery of the lower surface of the insert 100 and the side surfaces of the insert 100.

The elastomeric frame 200 may be configured such that the interface with the insert 100 extends to ensure airtight adhesion with the insert 100.

For example, an insert receiving hole 201 in which the insert 100 is disposed is provided in the elastomeric frame 200. Furthermore, a step 230 is provided on an internal circumferential surface of the insert receiving hole 201, the step 230 surrounding the lower and the side surfaces of the insert 100.

Accordingly, thermal-bonded portions are provided by performing thermal-bonding on the interfaces between the insert 100 and the elastomeric frame 200 such that solid bonding and integration are achieved therebetween.

As illustrated in FIG. 2, the thermal-bonded portions include: a first thermal-bonded portion H1 in which the step 230 of the elastomeric frame 200 and the lower surface of the insert 100 face each other and are thermally bonded together; a second thermal-bonded portion H2 in a form of a recess in which the step 230 and the side surface of the insert 100 face each other and are thermally bonded together.

Meanwhile, the elastomeric frame 200 is configured with an inlet manifold through-hole and an outlet manifold through-hole to provide manifolds introducing and discharging the reaction gas and the coolant to a reaction surface provided by the insert 100.

For example, multiple inlet manifold through-holes 210 through which the reaction gas and the coolant are introduced are provided on one side of the elastomeric frame 200, and multiple outlet manifold through-holes 220 through which the reaction gas and the coolant are discharged are provided on the opposite side of the inlet manifold through-holes 210.

Meanwhile, the elastomeric frame 200 may be provided with a means for sealing with the separators.

For example, at least one protrusion seal 240 is provided on upper and lower surfaces of the elastomeric frame 200, the protrusion seal 240 surrounding the insert 100 along the external region of the insert 100.

In an exemplary embodiment of the present invention, the protrusion seal 240 includes a first pair of protrusion seals formed on the upper surface of the elastomeric frame 200, and a second pair of protrusion seals formed on the lower surface of the elastomeric frame 200.

In an exemplary embodiment of the present invention, the first pair of protrusion seals formed on the upper surface of the elastomeric frame 200 and the second pair of protrusion seals formed on the lower surface of the elastomeric frame 200 are aligned along a same vertical axis.

A method of manufacturing an elastomeric cell frame for a fuel cell which is configured as described above will be described.

The method of manufacturing the elastomeric cell frame for a fuel cell according to an exemplary embodiment of the present invention includes: preparing an insert 100 by bonding GDLs 120 to opposite surfaces of an MEA 110; preparing a sheet-shaped elastomeric frame 200; disposing the insert 100 such that a periphery of one of the opposite surfaces of the insert 100 is overlapped with the elastomeric frame 200; and integrating the elastomeric frame 200 and the insert 100 with each other by thermal bonding in which an overlapped portion of the elastomeric frame 200 and the insert 100 is heated and pressed.

In the preparing of the insert, the insert 100 is prepared by bonding the MEA 110 and the GDLs 120 to each other.

Here, the MEA 110 is a general MEA in which a polymer-electrolyte membrane, and a cathode and an anode are provided on opposite sides of the polymer-electrolyte membrane.

Furthermore, the GDLs 120 are general GDLs configured as a single substrate or configured as a substrate with a MPL provided as a surface of the substrate.

As such, the GDLs 120 are stacked on the opposite surfaces of the MEA 110 to prepare the insert 100.

In the preparing of the elastomeric frame, a sheet-shaped elastomeric frame 200 to be disposed to surround the external region of the insert 100 is prepared.

The elastomeric frame 200 is prepared by molding a thermoplastic elastomer (TPE) in a form of a sheet. Here, the elastomeric frame 200 is preferably prepared by performing injection-molding of a TPE into a sheet form.

In the molding of the elastomeric frame 200, an insert receiving hole 201 in which the insert 100 is disposed; multiple inlet manifold through-holes 210 through which reaction gas and coolant are introduced; multiple outlet manifold through-holes 220 through which the reaction gas and the coolant are discharged; and a step 230 covering the lower surface and the side surface of the insert 100 are formed. Furthermore, at least one protrusion seal 240 is formed for airtightness with separators.

In the disposing of the insert, the periphery of the one of the opposite surfaces of the insert 100 is overlapped with the elastomeric frame 200. A periphery of a lower surface of the insert 100 is accommodated on the step 230 of the elastomeric frame 200 such that the side surfaces of the insert 100 faces an internal circumferential surface of the insert receiving hole 201 of the elastomeric frame 200.

In the integrating of the elastomeric frame and the insert, the elastomeric frame 200 and the insert 100 are bonded to each other by thermal bonding the elastomeric frame 200.

Here, the thermal bonding may be any one of hot-press bonding, ultrasonic bonding, high frequency bonding, vibration bonding, infrared bonding, radiant-heat bonding, calender bonding and laser bonding. The thermal bonding is preferably a hot-press bonding in which heat and pressure are easily provided. For this, the elastomeric frame 200 and the insert 100 are accommodated in a hot press mold.

As such, the hot press mold is operated to heat and press a portion or all of the region corresponding to the external region of the insert 100 such that the elastomeric frame 200 is melted and bonded to the insert 100. Thus, the elastomeric frame 200 and the insert 100 are bonded together without using an adhesive member by performing thermal-bonding on the interface of the elastomeric frame 200.

The heat applied to the elastomeric frame 200 is preferably higher than melting temperature of the elastomeric frame 200 to securely bond the elastomeric frame 200 and the insert 100 together.

Meanwhile, an elastic cell frame for a fuel cell configured as described above and separators form a unit cell for a fuel cell.

A unit cell for a fuel cell includes: an insert 100 in which an MEA 110 and a pair of GDLs 120 disposed on opposite surfaces of the MEA 110 are bonded to each other; an elastomeric cell frame including a sheet-shaped elastomeric frame 200 disposed in the external region of the insert 100 such that the elastomeric frame 200 surrounds a periphery of a lower surface of the insert 100 and side surfaces of the insert 100, and bonded to the periphery of the lower surface and the side surfaces of the insert 100 into an integrated structure by thermal bonding; and a pair of separators disposed on opposite surfaces of the elastomeric cell frame to guide flow of reaction gas and coolant.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An elastomeric cell frame for a fuel cell which forms a unit cell of a fuel cell stack, the elastomeric cell frame comprising:
    an insert including a membrane electrode assembly (MEA) and a pair of gas diffusion layers (GDLs) disposed on and bonded on upper and lower surfaces of the MEA, respectively; and
    an elastomeric frame member disposed in an external region of the insert,
    wherein the elastomeric frame member is provided to surround side surfaces of the insert in which the side surfaces of the insert are positioned between upper and lower surfaces of the insert and one of the upper and lower surfaces of the insert, and bonded with the one of the upper and lower surfaces of the insert and the side surfaces of the insert, into an integrated structure by thermal bonding.

2. The elastomeric frame of claim 1,
    wherein the thermal bonding is one of hot-press bonding, ultrasonic bonding, high frequency bonding, vibration bonding, infrared bonding, radiant-heat bonding, calender bonding and laser bonding.

3. The elastomeric frame of claim 1,
    wherein the elastomeric frame member includes an insert receiving hole in which the insert is disposed, and
    wherein an internal circumferential surface of the insert receiving hole includes a step surrounding the one of the upper and lower surfaces of the insert and the side surfaces of the insert.

4. The elastomeric cell frame of claim 3,
    wherein the elastomeric frame member includes thermal-bonded portions having:
    a first thermal-bonded portion in which the step of the elastomeric frame member and the one of the upper and lower surfaces of the insert face each other and are thermally bonded together; and
    a second thermal-bonded portion formed in a shape of a recess, in which the side surfaces of the insert are thermally bonded to the second thermal-bonded portion.

5. The elastomeric cell frame of claim 1,
wherein a plurality of inlet manifold through-holes through which reaction gas and coolant are introduced are provided on a first side of the elastomeric frame member, and
wherein a plurality of outlet manifold through-holes through which the reaction gas and the coolant are discharged are provided on a second side of the elastomeric frame member, which is an opposite side of the inlet manifold through-holes.

6. The elastomeric cell frame of claim 1,
wherein at least one of the upper and lower surfaces of the elastomeric frame member is provided with at least one protrusion seal surrounding the insert along the external region of the insert.

7. The elastomeric cell frame of claim 6,
wherein the at least one protrusion seal includes a first pair of protrusion seals formed on the upper surface of the elastomeric frame member, and
wherein the at least one protrusion seal includes a second pair of protrusion seals formed on the lower surface of the elastomeric frame.

8. The elastomeric cell frame of claim 7,
wherein the first pair of protrusion seals formed on the upper surface of the elastomeric frame member and the second pair of protrusion seals formed on the lower surface of the elastomeric frame member are aligned along a same vertical axis.

9. The elastomeric cell frame of claim 1, wherein the elastomeric frame member is formed of a thermoplastic elastomer (TPE).

10. The elastomeric cell frame of claim 1, wherein the elastomeric frame member is formed in a form of a sheet.

11. A method of manufacturing an elastomeric cell frame for a fuel cell which forms a unit cell of a fuel cell stack, the method including:
preparing an insert by bonding gas diffusion layers (GDLs) to upper and lower surfaces of a membrane electrode assembly (MEA);
preparing an elastomeric frame member;
disposing the insert so that side surfaces of the insert in which the side surfaces of the insert are positioned between upper and lower surfaces of the insert, and one of the upper and lower surfaces of the insert, are overlapped with the elastomeric frame member; and
integrating the elastomeric frame member and the insert with each other by thermal bonding in which an overlapped portion of the elastomeric frame member and the insert is heated and pressed.

12. The method of claim 11,
wherein the thermal bonding is one of hot-press bonding, ultrasonic bonding, high frequency bonding, vibration bonding, infrared bonding, radiant-heat bonding, calender bonding and laser bonding.

13. The method of claim 11,
wherein, in the preparing of the elastomeric frame member, the elastomeric frame member is prepared by molding a thermoplastic elastomer (TPE) into a sheet form.

14. The method of claim 11,
wherein, in the preparing of the elastomeric frame member, the elastomeric frame member includes an insert receiving hole in which the insert is disposed, and an internal circumferential surface of the insert receiving hole includes a step surrounding the one of the upper and lower surfaces of the insert and the side surfaces of the insert, and
wherein, in the disposing of the insert, the insert is disposed such that a periphery of the one of the upper and lower surfaces of the insert is accommodated on the step.

15. The method of claim 14,
wherein the elastomeric frame member includes thermal-bonded portions having:
a first thermal-bonded portion in which the step of the elastomeric frame member and the one of the upper and lower surfaces of the insert face each other and are thermally bonded together; and
a second thermal-bonded portion formed in a shape of a recess, in which the side surfaces of the insert are thermally bonded to the second thermal-bonded portion.

16. The method of claim 11,
wherein, in the integrating of the elastomeric frame member and the insert, a temperature of heat applied to the elastomeric frame member is higher than melting temperature of the elastomeric frame.

17. The method of claim 11,
wherein, in the integrating of the elastomeric frame member and the insert, the elastomeric frame member is thermally bonded to the insert without using an adhesive member.

18. A unit cell for a fuel cell, the unit cell comprising:
an insert including a membrane electrode assembly (MEA) and a pair of gas diffusion layers (GDLs) disposed on and bonded on upper and lower surfaces of the MEA, respectively;
an elastomeric cell frame including an elastomeric frame member disposed in an external region of the insert, wherein the elastomeric frame member is provided to surround side surfaces of the insert, in which the side surfaces of the insert are positioned between upper and lower surfaces of the insert, and one of the upper and lower surfaces of the insert and the side surfaces of the insert, and bonded with the one of the upper and lower surfaces of the insert and the side surfaces of the insert, into an integrated structure by thermal bonding; and
a pair of separators disposed on the upper and lower surfaces of the elastomeric cell frame member to guide flow of reaction gas and coolant.

19. The unit cell of claim 18,
wherein the elastomeric frame member includes a step and a thermal-bonded portions, and
wherein the thermal-bonded portions includes:
a first thermal-bonded portion in which the step of the elastomeric frame member and the one of the upper and lower surfaces of the insert face each other and are thermally bonded together; and
a second thermal-bonded portion formed in a shape of a recess, in which the side surfaces of the insert are thermally bonded to the second thermal-bonded portion.

20. The unit cell of claim 18,
wherein the thermal bonding is one of hot-press bonding, ultrasonic bonding, high frequency bonding, vibration bonding, infrared bonding, radiant-heat bonding, calender bonding and laser bonding.

* * * * *